(12) United States Patent
Glasgow

(10) Patent No.: US 6,226,033 B1
(45) Date of Patent: *May 1, 2001

(54) VIDEO SIGNAL FORMAT FOR POST-PRODUCTION

(75) Inventor: Paul Robert Glasgow, Thatcham (GB)

(73) Assignees: Sony Corporation, Tokyo (JP); Sony United Kingdom Limited, Waybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,610

(22) Filed: Jul. 7, 1997

Related U.S. Application Data

(63) Continuation of application No. 08/541,041, filed on Oct. 11, 1995, now abandoned.

(30) Foreign Application Priority Data

Nov. 25, 1994 (GB) .................................................. 9423873

(51) Int. Cl.[7] .................................................. H04N 5/253
(52) U.S. Cl. .................................................. 348/97; 348/441
(58) Field of Search .................................................. 348/96, 97, 441, 348/443, 448, 458, 459, 469, 911; H04N 5/253

(56) References Cited

FOREIGN PATENT DOCUMENTS

| | | |
|---|---|---|
| 2 248 743 | 4/1992 | (GB) . |
| 2 250 655 | 6/1992 | (GB) . |
| 2 264 417 | 8/1993 | (GB) . |
| 2 272 816 | 5/1994 | (GB) . |

*Primary Examiner*—Young Lee
(74) *Attorney, Agent, or Firm*—Frommer Lawrence & Haug, LLP.; William S. Frommer; Glenn F. Savit

(57) ABSTRACT

The gateway video signal is generated from inputted frames which represent a motion picture when reproduced at a real-time rate. The inputted frames are sped up to 1.2 or 1.25 times the real-time rate. The sped up frames are, then, converted to 60 field/second, thereby generating the gateway video signal.

6 Claims, 3 Drawing Sheets

VIDEO SIGNAL FORMAT FOR POST-PRODUCTION

This application is a continuation of application Ser. No. 08/541,041, filed Oct. 11, 1995.

BACKGROUND OF THE INVENTION

1. Field of the Invention

This invention relates to conversion of film to video, post-production of video, conversion of video to film, and conversion between different video formats.

2. Description of the Prior Art

A vast amount of film masters are in a 24 frame/s or 25 frame/s format, and often it is required to convert the film to video for distribution, post-production and broadcast transmission, and to convert the video back to film as a sub-master. One standard format for video employs interlaced fields at 60 field/s. For example, the SMPTE 240M high definition format employs 1125 line/frame, 2:1 interlace, 60 field/s. Because of the difference in frame rate between the film and video, there is no one-to-one correspondence between the film frames and the video frames, and this presents a problem.

A partial solution to this problem in the case of 24 frame/s film (and also 25 frame/s film if a slightly incorrect speed is not unacceptable) is to use a 3232 format for the video. With 3232, there is a correspondence between a series of four film frames and ten video fields as follows:

| Film | Video |
| --- | --- |
| Frame 1 | Frame 1 odd field |
| Frame 1 | Frame 1 even field |
| Frame 1 | Frame 2 odd field (additional) |
| Frame 2 | Frame 2 even field |
| Frame 2 | Frame 3 odd field |
| Frame 3 | Frame 3 even field |
| Frame 3 | Frame 4 odd field |
| Frame 3 | Frame 4 even field (additional) |
| Frame 4 | Frame 5 odd field |
| Frame 4 | Frame 5 even field |

It will therefore be appreciated that the real-time relationship between 24 frame/s film and 60 field/s video is maintained (at least when averaged over a four film frame period), but that two of the video fields, frame 2 odd and frame 4 even, are duplicated, and so the fields of video frame 2 do not correspond to a single film frame and likewise with the fields of video frame 3. During post-production of 3232 video, for example combining two 3232 video signals, there is the problem of synchronising the additional fields of the signals, so that if the video is later converted back to film the additional fields can be dropped and the other fields can all be maintained. Subsequent conversion to 50 field/s video compounds the problem, because every sixth field needs to be dropped. Sometimes the dropped field will be an additional field, and sometimes it will not.

SUMMARY OF THE INVENTION

The video signal according to the invention

In accordance with one aspect of the present invention, there is provided a video signal, such as a 1125 lines/frame high definition video signal, representing material which is acquired or generated at a real-time rate, wherein the video signal is in a 60 field/s format at 1.25 or 1.2 times the real-time rate. Such a video signal will hereinafter be referred to as a "gateway" video signal.

The gateway video signal provides a number of advantageous possibilities, including:
- frame-locked transfer of material from real-time 24 frame/s and 25 frame/s film to the gateway format;
- frame-accurate post-production editing not requiring a 3232 relationship and retaining the gateway format;
- real-time post-production editing with a synchronised 3232 relationship between different sources and the product; and
- frame-locked transfer of material from the gateway format to real-time 24 frame/s or 25 frame/s film and 50 field/s video.

In the case where source material is 24 frame/s film, the gateway video signal is at 1.25 times the real-time rate, hereinafter referred to as a "125% gateway" signal. In the case where the source material is 25 frame/s film, the gateway video signal is at 1.2 times the real-time rate, hereinafter referred to as a "120% gateway" signal.

Conversion of film to Gateway video

Very conveniently, a 30 frame/s telecine may be used to produce a 125% gateway signal from 24 frame/s film, and to produce a 120% gateway signal from 25 frame/s film.

Conversion of conventional 60 Hz video to Gateway video

The invention also provides a (first) method of converting a source 60 field/s video signal to a gateway video signal, comprising the step of dropping every fifth field from the source signal for 125% gateway video or dropping every sixth field from the source signal for 120% gateway video.

The invention furthermore provides a (first) apparatus for reproducing a gateway video signal from a source 60 field/s video signal recording, the apparatus including means for reproducing and outputting four out of every five fields of the recorded video signal for a 125% gateway signal, or five out of every six fields of the recorded video signal for a 120% gateway signal. Preferably, said reproducing and outputting means comprises means for reproducing the recording at 75 field/s for 125% gateway or 72 field/s for 120% gateway, and means for outputting four out of every five, or five out of every six, as the case may be, of the reproduced fields at 60 field/s.

Conversion of Gateway video to film.

Very conveniently, a 30 frame/s electron beam recorder ("EBR") may be used to produce a film from a gateway signal. In the case of 125% gateway video, this will produce film whose proper speed is 24 frame/s, but for which viewing at 25 frame/s may be acceptable in many cases. In the case of 120% gateway video, this will produce film whose proper speed is 25 frame/s, but for which viewing at 24 frame/s may be acceptable in many cases.

Conversion of Gateway video to normal speed 60 field/s video

The invention provides a (second) method of converting a gateway video signal to a second real-time, or nearly real-time, 60 field/s video signal, comprising the step of duplicating every fourth field of the gateway signal to produce the second signal. This produces a real-time signal from a 125% gateway video signal, and a signal which is 0.96 of real-time from a 120% gateway signal. This method preferably further comprises the step of keeping track of the duplicated fields.

The invention also provides a (second) apparatus for reproducing a 60 field/s video signal from a recording of a gateway signal, the apparatus including means for reproducing the fields of the recorded video signal and duplicating every fourth reproduced field. In this case, the reproducing and duplicating means preferably comprises means for reproducing the recorded signal at 48 field/s and means for duplicating every fourth field to provide a field rate of 60 field/s. Preferably, means is provided for keeping track of the duplicated fields.

The invention also provides a (third) method of converting a gateway video signal to a second real-time, or nearly real-time, 60 field/s video signal, comprising the step of duplicating every fifth field of the gateway signal to produce the second signal. This produces a real-time signal from a 120% gateway video signal, and signal which is 1.042 of real-time from a 125% gateway signal. The method preferably further comprises the step of keeping track of the duplicated fields.

The invention also provides a (third) apparatus for reproducing a 60 field/s video signal from a recording of a gateway signal, the apparatus including means for reproducing the fields of the recorded video signal and duplicating every fifth reproduced field. In this case, the reproducing and duplicating means preferably comprises means for reproducing the recorded signal at 50 field/s and means for duplicating every fifth field to provide a field rate of 60 field/s. Preferably, means is included for keeping track of the duplicated fields.

Conversion of Gateway video to normal speed 50 field/s video

Optionally, the third method further comprises the step of conversion from the second signal to a 50 field/s video signal by dropping one in every six fields of the second signal. Preferably, the dropped fields are the fields which were duplicated when producing the second signal from the gateway signal.

Optionally, the third apparatus further comprises means, such as a 1125 lines, 60 field/s to 1250 lines, 50 field/s standards converter, or a 1125 lines, 60 field/s to 625 lines, 50 field/s standards converter, for dropping one in every six fields of the 60 field/s signal, preferably the duplicated fields.

It will therefore be appreciated that there is a one-to-one correspondence between the field pairs of the 50 field/s video signal and any film frames which were used in producing the signal. This makes the 50 field/s signal particularly valuable for further post-production in the 50 field/s domain, for example in a 625 lines, 50 field/s format.

Post-production of Gateway video

Post-production editing may be carried out directly on one or more gateway video signals, thus at 1.25 or 1.2 times the real-time rate, which in many cases may be advantageous. However, for previewing, the edited signal may be converted by the second or third method mentioned above, or by the second or third apparatus mentioned above, so that previewing may be carried out at, or at about, the real-time rate.

Alternatively, post-production editing may be carried out at, or at about, the real-time rate by firstly converting one or more gateway video signals using the second method or second apparatus mentioned above, and then carrying out editing. In this case, when two or more of the converted signals are to be combined, the duplicated fields are synchronised, and preferably a track is still kept of the duplicated fields. This provides the advantage that if the edited signal is subsequently down-converted to 525 lines, 60 field/s, further post-production can be carried out on the down-converted signal as if it had been directly produced from film in 3232 format.

Recordings of Gateway signals

The invention furthermore provides a recording of a gateway video signal. It will be appreciated that, compared with a conventional 60 field/s 3232 recording, 20% less recording medium is required.

Gateway video tape reproducing machine

The invention also provides an apparatus (such as a video tape recorder ("VTR") or video disk player) for reproducing a video signal recorded on a medium in a 60 field/s format, comprising:

means for controlling a play speed of the recording medium;

means for reproducing fields of the video signal recorded on the medium; and means for buffering and outputting at 60 field/s fields of the reproduced signal;

wherein the speed controlling means and field buffering means are operable in at least one of the following modes, including at least one of modes (A), (B), (D) and (E):

(A) the play speed is 75 field/s and four out of every five reproduced fields are output;

(B) the play speed is 72 field/s and five out of every six reproduced fields are output;

(C) the play speed is 60 field/s and all of the reproduced fields are output;

(D) the play speed is 50 field/s and all of the reproduced fields are output together with one out of every five reproduced fields which is duplicated; and (E) the play speed is 48 field/s and all of the reproduced fields are output together with one out of every four reproduced fields which is duplicated.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
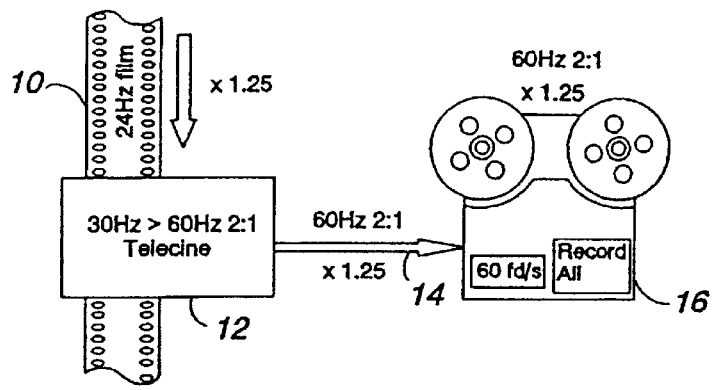
FIGS. 1 and 2 illustrate conversion of 24 frame/s and 25 frame/s film to gateway video signals.

Referring to FIG. 1, a 125% gateway recording can be produced from 24 frame/s film 10 by running the film through a conventional telecine 12 which is conventionally used for producing 60 field/s 2:1 high definition video from 30 frame/s film. Motion in the picture represented by the output signal 14 from the telecine 12 is at 1.25 times the real-time rate, and the signal 14 is recorded by a conventional 60 Hz 2:1 high definition VTR 16, so that the recorded signal is 1.25 times the real-time rate with a one-to-one correspondence between the 1/24s frames of the film 10 and the 1/30s field pairs of the video signal.

Figure 2:
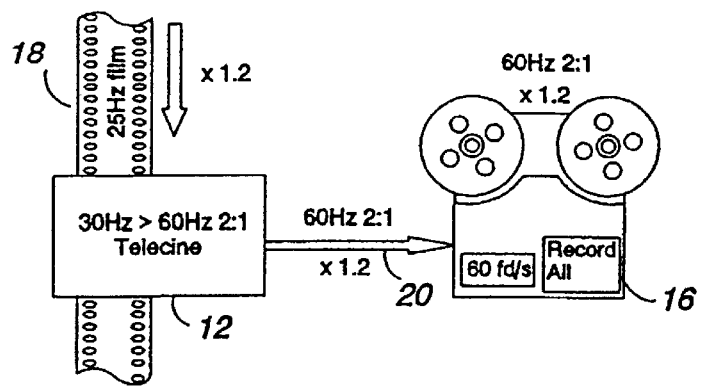

Referring to FIG. 2, a 120% gateway recording can be produced from 25 frame/s film 18 using the same equipment as shown in FIG. 1. In this case, motion in the picture represented by the output signal 20 from the telecine 12 is at 1.2 times the real-time rate, and there is a one-to-one correspondence between the 1/25s frames of the film 18 and the 1/30s field pairs of the video signal.

Figure 3:
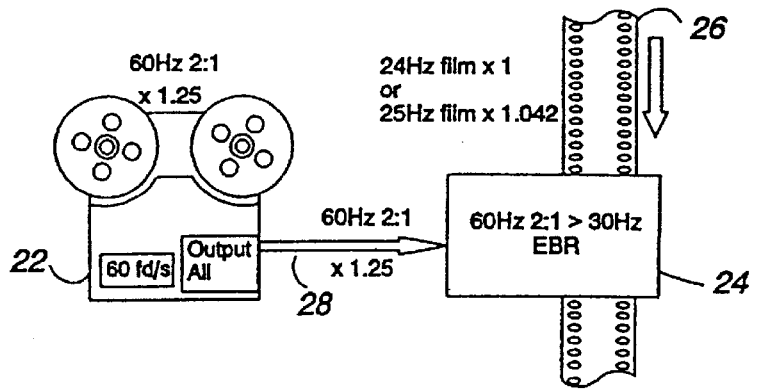
FIGS. 3 and 4 illustrate conversion of 125% and 120% gateway video signals to film.

Referring to FIG. 3, a film 22 can be produced from a 125% gateway video recording, by outputting the video from a VTR to a conventional EBR 24 which is conventionally used for producing 30 frame/s film from 60 field/s 2:1 high definition video, so as to produce a film 26. If the film 26 is used as a 24 frame/s film, then motion will appear at the real-time rate, but if the film 26 is used as a 25 frame/s film, motion will appear at 1.042 times the real-time rate, which is acceptable in many cases. It will be appreciated that there is a one-to-one correspondence between the field pairs of the video signal and the frames of the film 26.

Figure 4:
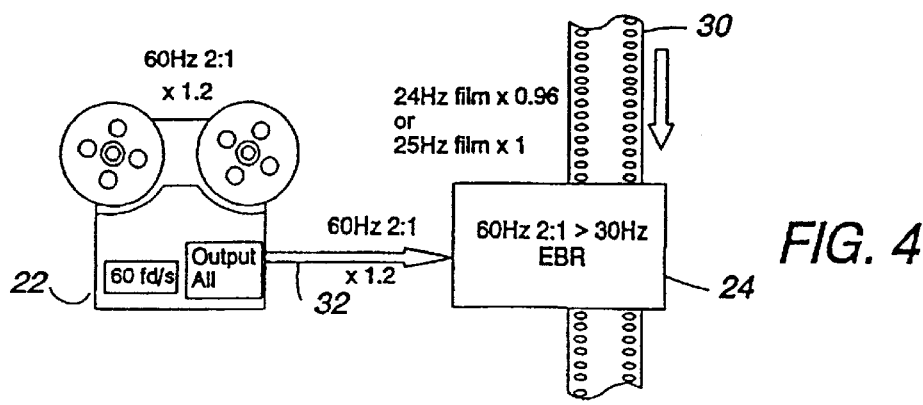

Referring to FIG. 4, a film 30 can be produced from a 120% gateway video recording using the same equipment as shown in FIG. 3. In this case, if the film 30 is used as 25 frame/s film, motion will appear at the real-time rate, but if used as 24 frame/s film motion will appear at 0.96 times the real-time rate, which again is acceptable in many cases. Again, there is a one-to-one correspondence between the field pairs of the video signal 32 and the frames of the film 30.

Figure 5:
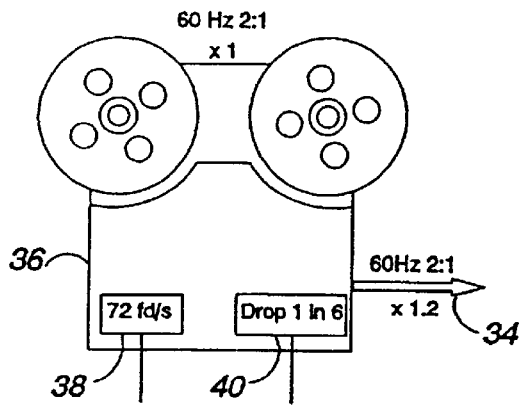
FIG. 5 shows a VTR for converting a 60 field/s video recording to a gateway signal.

Referring to FIG. 5, a 120% gateway video signal 34 can be produced from a conventional 60 field/s video recording using a modified VTR 36. In the modified VTR 36, a tape speed control circuit 38 is set so that the tape speed is 72 field/s, rather than 60 field/s, and the control 40 of the framestores of the VTR 36 is set so that every sixth field reproduced from the tape is dropped, the polarities of some of the fields are reversed, and the fields are output at 60 field/s, as follows:

| Reproduced Field Number and Polarity | Dropped | Polarity Reversal | Output Field Number and Polarity |
| --- | --- | --- | --- |
| 1 odd | No | No | 1 odd |
| 2 even | No | No | 2 even |
| 3 odd | No | No | 3 odd |
| 4 even | No | No | 4 even |
| 5 odd | No | No | 5 odd |
| 6 even | Yes | — | — |
| 7 odd | No | Yes | 6 even |
| 8 even | No | Yes | 7 odd |
| 9 odd | No | Yes | 8 even |
| 10 even | No | Yes | 9 odd |
| 11 odd | No | Yes | 10 even |
| 12 even | Yes | — | — |

It will therefore be appreciated that motion in the picture represented by the output signal 34 will appear at 1.2 times the real-time rate. The output signal 34 may also be treated as a 125% gateway signal, but in this case it will be at 0.96 times the proper speed for a 125% gateway signal, but in many cases this may be acceptable.

The arrangement of FIG. 5 may also be modified to produce a 125% gateway video signal at the proper speed for such a signal by altering the setting of the tape speed control circuit to 75 field/s and by altering the control 40 of the framestores so that every fifth field reproduced from the tape is dropped, the polarities of some of the fields are reversed, and the fields are output at 60 field/s, as follows:

| Reproduced Field Number and Polarity | Dropped | Polarity Reversal | Output Field Number and Polarity |
| --- | --- | --- | --- |
| 1 odd | No | No | 1 odd |
| 2 even | No | No | 2 even |
| 3 odd | No | No | 3 odd |
| 4 even | No | No | 4 even |
| 5 odd | Yes | — | — |
| 6 even | No | Yes | 5 odd |
| 7 odd | No | Yes | 6 even |
| 8 even | No | Yes | 7 odd |
| 9 odd | No | Yes | 8 even |
| 10 even | Yes | — | — |

It will therefore be appreciated that motion in the picture represented by the output signal will appear at 1.25 times the real-time rate. The output signal may also be treated as a 120% gateway signal, but in this case it will be at 1.047 times the proper speed for a 120% gateway signal, but in many cases this may be acceptable.

Figure 6:
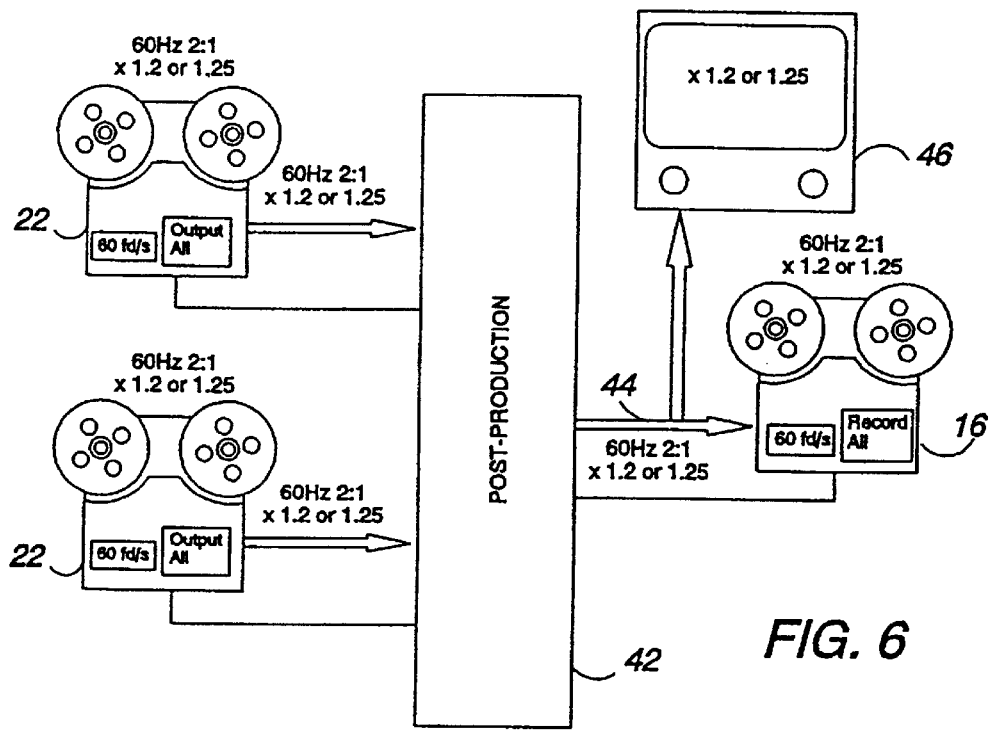
FIG. 6 shows a post-production facility for gateway video signals.

FIG. 6 shows a post-production facility for gateway video signals. There are one or more sources of gateway video signals. These may include conventional 60 field/s VTRs 22 which are reproducing gateway recordings or a modified VTR 36 as described above with reference to FIG. 5 which is reproducing a conventional recording in a special manner. The post-production facility also includes a post-production desk 42 for performing various operations on the source video signals such as combining, fading, zooming, shifting, colouring and other editing. The post-production desk provides an output gateway signal 44 to a conventional 60 field/s VTR 16 which records the signal 44 and also to a 60 field/s monitor 46. It will be appreciated that the recording of the gateway signal 44 is at 1.2 or 1.25 times the real-time rate, and that the picture displayed by the monitor 46 is also at 1.2 or 1.25 times the real-time rate. It will also be appreciated that there is still a one-to-one correspondence between field pairs of the output signal 44 and any film frames which are used in producing the output signal 44.

Figure 7:
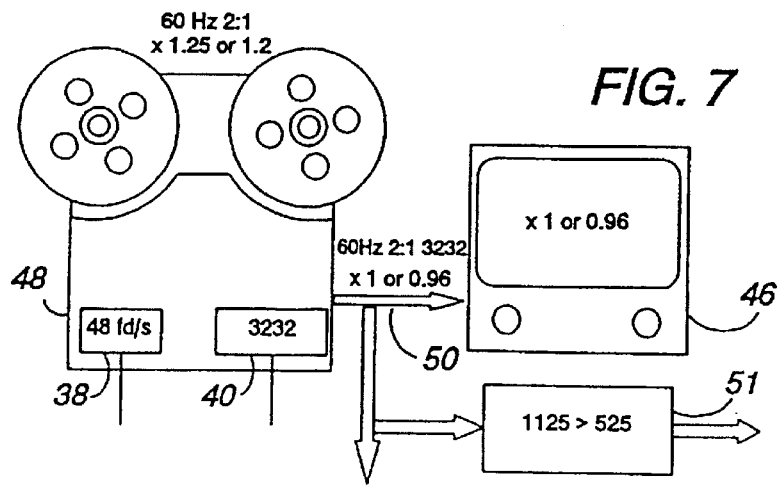
FIGS. 7 and 8 show two arrangements for previewing and converting gateway video signals.

In order to preview the results of a 125% gateway post-production operation, an arrangement as shown in FIG. 7 may be used. The recorded gateway signal is reproduced by a modified VTR 48. In the modified VTR 48, the speed control circuit 38 is set so that the tape speed is 48 field/s, rather than 60 field/s, and the control 40 of the framestores of the VTR 48 is set so that one in every four reproduced fields is duplicated and the polarities of some of the fields are reversed as follows so that the fields are output in a 3232 format at 60 field/s as an output signal 58. Also, the first output field in each series of ten fields is flagged for a purpose to be described later.

| Reproduced Field Number and Polarity | Duplicated | Polarity Reversal | Output Field Number and Polarity | Flagged |
| --- | --- | --- | --- | --- |
| 1 odd | No | No | 1 odd | Yes |
| 2 even | Yes | No | 2 even | No |
|  |  | Yes | 3 odd | No |
| 3 odd | No | Yes | 4 even | No |
| 4 even | No | Yes | 5 odd | No |
| 5 odd | No | Yes | 6 even | No |

-continued

| Reproduced Field Number and Polarity | Duplicated | Polarity Reversal | Output Field Number and Polarity | Flagged |
|---|---|---|---|---|
| 6 even | Yes | Yes | 7 odd | No |
|  |  | No | 8 even | No |
| 7 odd | No | No | 9 odd | No |
| 8 even | No | No | 10 even | No |

The output signal 50 is then displayed on a 60 Hz 2:1 monitor 46. It will therefore be appreciated that motion in the picture displayed by the monitor will be at the real-time rate, and although motion artifacts may be introduced by the 3232 format, these will be no worse than would be the case if the video signal had originally been acquired from source film using a 3232 format.

The arrangement of FIG. 7 may also be used to preview a 120% gateway signal, but in this case the displayed picture will be at 0.96 the real-time rate, but in many cases this will be acceptable.

The signal 50 produced by the arrangement of FIG. 7 may also be transmitted as an 1125 lines 60 field/s 2:1 interlace high definition video signal, or may be supplied to an 1125 lines to 525 lines down-converter 51 and then transmitted as a 525 lines 60 field/s 2:1 interlace conventional definition video signal.

Figure 8:
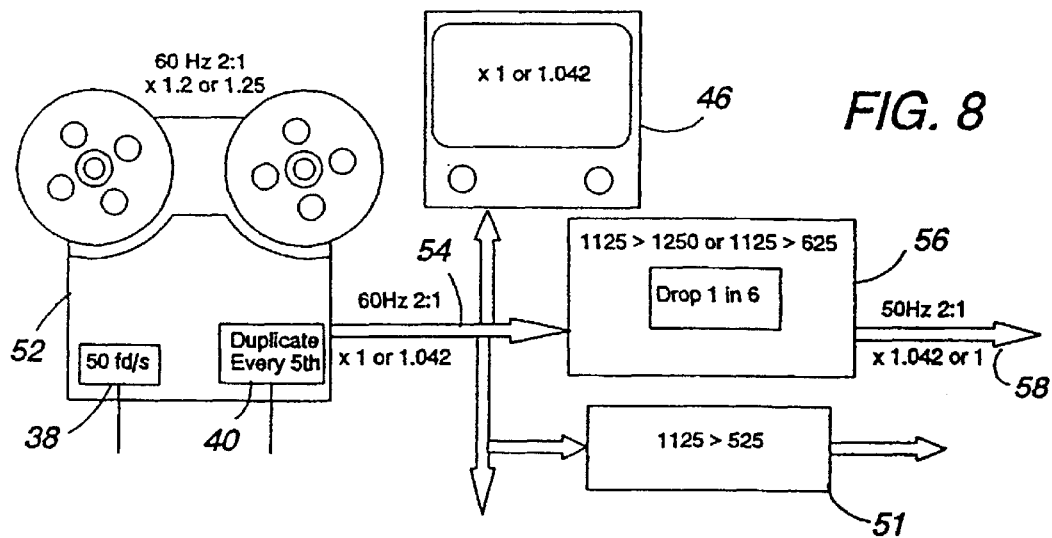

In order to preview the results of a 120% gateway post-production operation, an arrangement as shown in FIG. 8 may be used. The recorded gateway signal is reproduced by a modified VTR 52. In the modified VTR 52, the speed control circuit 38 is set so that the tape speed is 50 field/s, and the control 40 of the framestores of the VTR is set so that one in every five reproduced fields is duplicated and the polarities of some of the fields are reversed as follows so that the fields are output at 60 field/s as an output signal 54. Also each of the duplicated fields is flagged.

| Reproduced Field Number and Polarity | Duplicated | Polarity Reversal | Output Field Number and Polarity | Flagged |
|---|---|---|---|---|
| 1 odd | No | No | 1 odd | No |
| 2 even | No | No | 2 even | No |
| 3 odd | No | No | 3 odd | No |
| 4 even | No | No | 4 even | No |
| 5 odd | Yes | No | 5 odd | No |
|  |  | Yes | 6 even | Yes |
| 6 even | No | Yes | 7 odd | No |
| 7 odd | No | Yes | 8 even | No |
| 8 even | No | Yes | 9 odd | No |
| 9 odd | No | Yes | 10 even | No |
| 10 even | Yes | Yes | 11 odd | No |
|  |  | No | 12 even | Yes |

The output signal 54 is then displayed on a 60 Hz 2:1 monitor 46. It will therefore be appreciated that motion in the picture displayed by the monitor will be at the real-time rate, and although motion artifacts may be introduced by the duplicated fields, these are likely to prove acceptable in many cases.

The arrangement of FIG. 8 may also be used for 125% gateway signals, but in this case the output video signal will be at 1.042 times the real-time rate, but in many cases this may be acceptable.

The video signal 54 produced by the arrangement of FIG. 8 may also be transmitted as an 1125 lines 60 field/s 2:1 interlace high definition video signal, or may be supplied to an 1125 lines to 525 lines down-converter 51 and then transmitted as a 525 lines 60 field/s 2:1 interlace conventional definition video signal.

Additionally, the signal 54 produced by the arrangement of FIG. 8 may be supplied to a 1125 lines, 60 field/s to 1250 lines, 50 field/s up-converter or 1125 lines, 60 field/s to 625 lines, 50 field/s down-converter 56 which drops the flagged fields and reverses the polarity of some of the fields as follows so that the fields are output a 50 field/s signal 58.

| 60 field/s Field Number and Polarity | Flagged | Dropped | Polarity Reversal | 50 Field/s Field Number and Polarity |
|---|---|---|---|---|
| 1 odd | No | No | No | 1 odd |
| 2 even | No | No | No | 2 even |
| 3 odd | No | No | No | 3 odd |
| 4 even | No | No | No | 4 even |
| 5 odd | No | No | No | 5 odd |
| 6 even | Yes | Yes | — | — |
| 7 odd | No | No | Yes | 6 even |
| 8 even | No | No | Yes | 7 odd |
| 9 odd | No | No | Yes | 8 even |
| 10 even | No | No | Yes | 9 odd |
| 11 odd | No | No | Yes | 10 even |
| 12 even | Yes | Yes | — | — |

Importantly, by dropping the flagged fields which we previously added, there is a one-to-one correspondence between the originating film frames and the field pairs of the 50 field/s signal 58. Therefore, not only is the 50 field/s signal 58 suitable for transmission, but it is also suitable for further post-production using a 50 field/s post-production facility.

Figure 9:
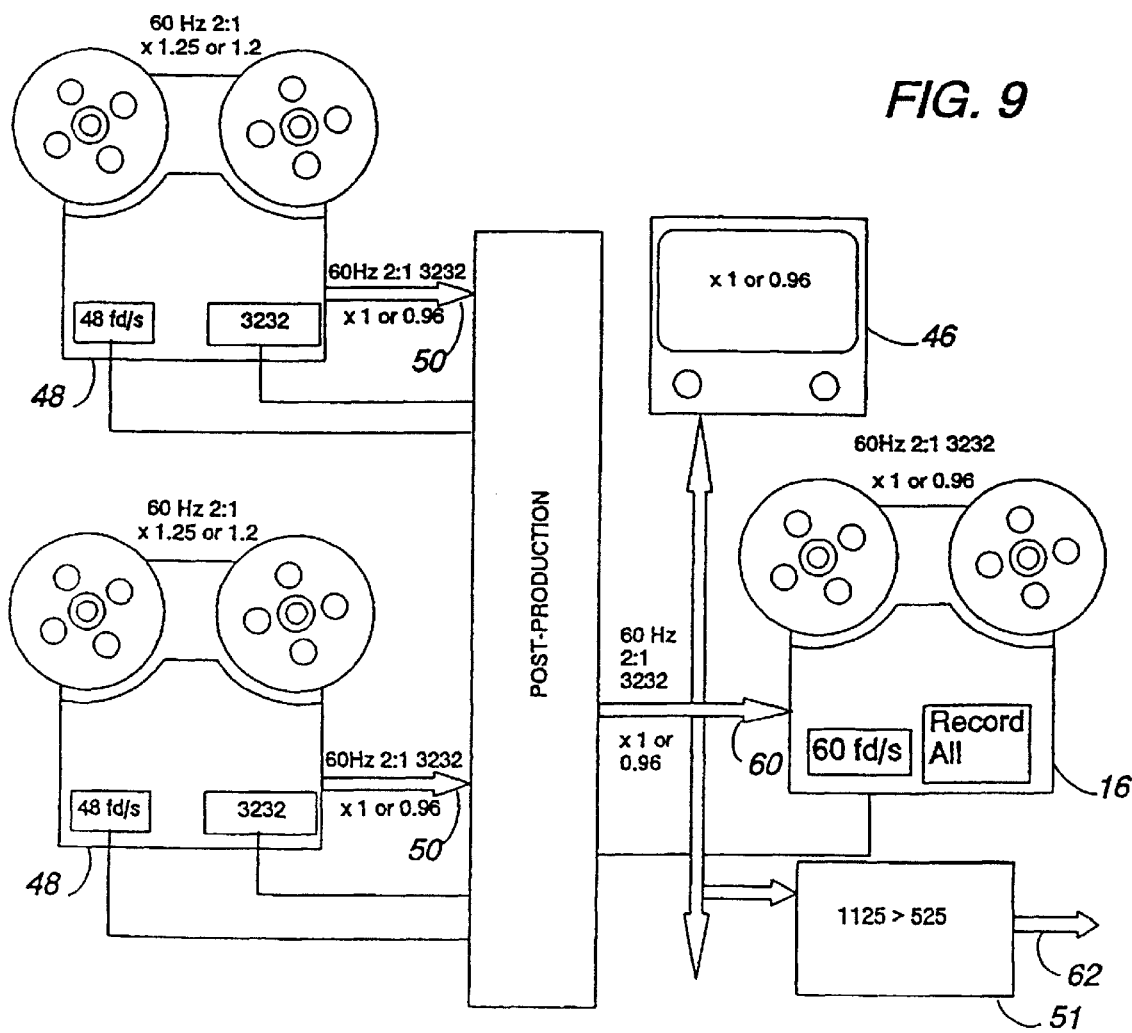
FIG. 9 shows a real-time post-production facility for gateway video signals.

Instead of direct post-production of the gateway signals as described with reference to FIG. 6, post-production of 125% gateway signals may be carried out at real-time using a facility as shown in FIG. 9. One or more gateway recordings are reproduced by VTRs 48 which are modified in the manner described with reference to FIG. 7 so as to produce a 60 field/s 3232 format signal at the real-time rate, with the first field in each ten field sequence flagged. When combining two or more of the signals 50, the VTRs 48 are controlled so that the flags of the signals 50 are synchronised, and the corresponding field of the output signal 60 is also flagged. The output signal 60 can then be recorded in its 3232 format by a conventional VTR 16, and/or transmitted, and/or supplied to a 1125 lines to 525 lines down-converter 51. Although the signal 62 output from the down-converter 51 is not in the gateway format but is in a real-time 3232 format, if it has been post-produced at 1125 lines from more than one film source, the 3232 relationships will be synchronised, and so the signal 62 is suitable for further post-production in the 525 lines format using a post-production facility which takes account of the 3232 format.

The arrangement of FIG. 9 may also be used for 120% gateway signals, but in this case the output video signal will be at 0.96 times the real-time rate, but in many cases this may be acceptable.

Whilst VTRs 16, 22, 36, 48 have been described above having different reproduction modes, it will be appreciated that a single VTR may be provided with the facility to operate selectably in any two or more of those modes.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method of generating a gateway video signal, comprising the steps of:

inputting film frames recorded at a real-time rate representing a motion picture when reproduced at a real-time rate to a telecine converter that normally converts film frames recorded at a frame/second rate which is substantially higher than said real-time rate into a video signal having a field/second rate thereby speeding up the input of said frames at a higher rate of 1.2 to 1.25 times said real-time rate;

converting the sped up frames input to said telecine converter to said gateway video signal at said field/second rate without adding video fields, thereby generating said gateway video signal at 1.2 to 1.25 times said real-time rate; and recording said gateway video signal on a recording medium at said higher rate, such that when the gateway video signal is reproduced from said recording medium at said higher rate, reproduced video appears at 1.2 to 1.25 times the real-time rate.

2. The method of claim 1, wherein the step of speeding up the input of said frames speeds up the input to 1.25 times said real-time rate.

3. The method of claim 1, further comprising the steps of:

reproducing said gateway video signal at said higher rate;

applying the reproduced gateway video signal to an electron beam recorder that normally records on film at said higher rate, said electron beam recorder then recording images represented by said gateway video signal on film at said higher rate, whereby when said film is reproduced at said real-time rate, reproduced video appears at the real time rate.

4. The method of claim 1, further comprising the steps of:

reproducing said recorded gateway video signal at said higher rate;

performing post-production processing on said reproduced gateway video signal; and recording the post-production processed gateway video signal.

5. The method of claim 4 wherein said post-production processing is performed at said higher rate.

6. The method of claim 4 wherein said recording of said post-production processed gateway video signal is performed at said higher rate.

* * * * *